Aug. 13, 1957
G. E. SELDON
2,802,343
SEALING REFRIGERATION COMPRESSORS
FOR AUTOMOTIVE AIR CONDITIONING
Filed May 24, 1954
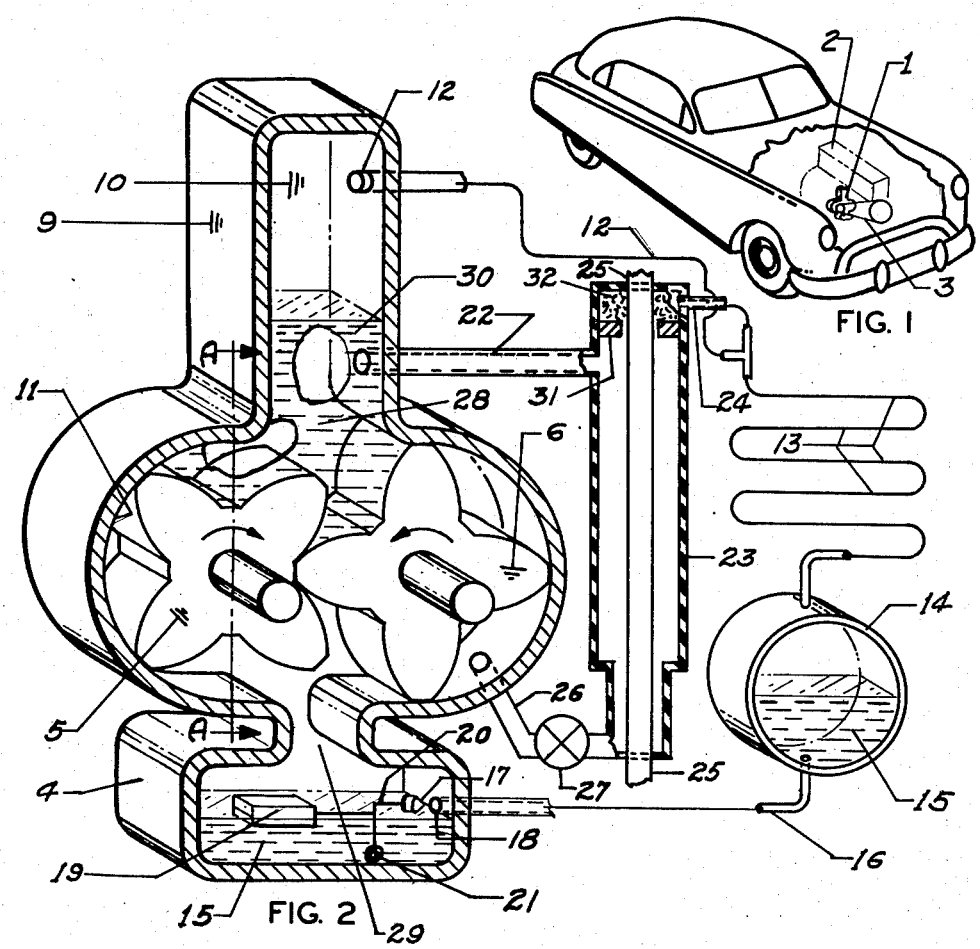
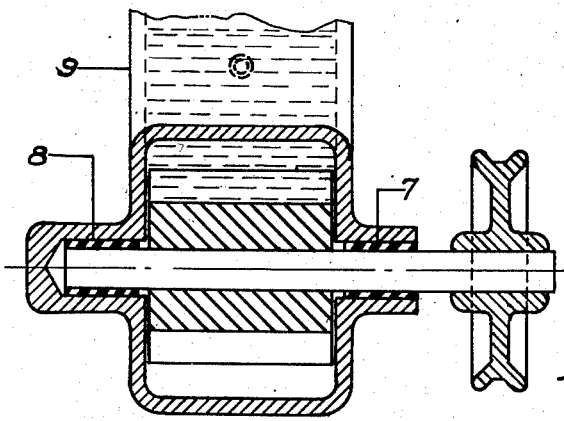
FIG. 3
George E. Seldon.

United States Patent Office 2,802,343
Patented Aug. 13, 1957

2,802,343

SEALING REFRIGERATION COMPRESSORS FOR AUTOMOTIVE AIR CONDITIONING

George E. Seldon, Kirkwood, Mo.

Application May 24, 1954, Serial No. 431,732

6 Claims. (Cl. 62—117.1)

This invention relates to improvements in refrigeration apparatus used in air conditioning an automobile. It is of more particular use in water charged systems or a system where the charge is not miscible in the sealing oil.

It is an object of this invention to provide means whereby a gear pump can be sealed so as to provide a vacuum adequate to vaporize water at about ¼ pound per square inch absolute (p. s. i. a.).

It is an object of this invention to seal a gear pump so as to make its high volumetric capacity at high speed available for the purpose of drawing large quantities of water vapor at low pressure out of the boiler.

It is an object of this invention to provide oil sealing for a gear compressor and to purify the contaminants out of said oil.

It is an object of this invention to provide a gear compressor for water refrigeration with adequate oil sealing mechanism.

It is a further object to provide a gear compressor for water refrigeration with a boiler directly attached to it, in fact to become an integral part of the compressor.

Figure 1 is a view of the automobile with the hood cut away to show the method of driving the compressor and its location in the car.

Figure 2 is an isometric view of the refrigeration system. The near covers of the compressor and the boiler have been removed to show the mating gears, the oil seal, the oil purifier, condenser, receiver and boiler with the control valve.

Figure 3 is a section A—A of Figure 2 and shows the gear closely contained by the housing and the oil on top of the gear sealing the space between the gear and the housing. The view also shows the drive pulley.

In Figure 1 the compressor unit 1 is driven directly by the engine 2 through a belt 3. The compressor unit can be mounted on a bracket attached to the engine or the frame. For clarity the bracket is not shown nor is it part of this invention.

Figure 2 is a larger view of the compressor unit 1 and boiler 4 containing water refrigerant 15. The compressor has a pair of meshing gears 5 and 6 mounted in bushings as shown at 7 and 8 in Figure 3. These bushings in turn are supported in the housing 9. This housing 9 fits the perimeter of the gears very closely except for the openings or ports 28 and 29 directly above and below the common plane containing the center lines of the pitch cylinders of the mating gears. The opening below the gears is at least as wide as a tooth height and opens directly into the boiler. Above the gears the port need not be as wide say about half of that below. The two ports 28 and 29 are centered about the common tangent plane to the pitch cylinders of the mating gears. The upper port 28 opens into a plenum chamber 10 where the mixture of vapor and oil can separate and the vapor rises to the top of the chamber while the oil being much heavier falls over the rotating gears 5 and 6 sealing the space between them and the space between the pinions and the gear case 11 which specifically covers the gears and is part of the housing casting 9. The housing 9 is not machined all over but the casing 11 where the gears operate must be completely machined to a minimum practical clearance.

This clearance space is then filled with oil from the lower portion of the plenum chamber 10. The oil stays on top of the gears only so long as the gears rotate, since it is the rotation of the gears that carries the oil up from the boiler portion 4 of the complete housing 9. On stopping the motion the higher pressure in the plenum chamber 10 drives the oil down past the gears and the casing into the boiler 4 and the bottom portion of the pump casing 11. The space at the bottom of the case 11 between the gears and the surface of the refrigerant 15 in the boiler may completely fill with oil during the at rest periods of the compressor. The boiler is coupled close to the compressor and the above described space is the low pressure vapor space. This space plus a small additional quantity in the case 11 and the plenum chamber 10 is preferably filled by the initial charge of sealing oil in the system. The quantity of oil is not critical however and considerably less will not impair efficiency. On restarting, the oil is quickly carried back up to the top of the casing and into the plenum chamber 10 by the gears 5 and 6. The plenum chamber 10 has sufficient volume to hold a substantial proportion of all the oil in the system. It also provides space for the oil to separate from the water vapor and oil emulsion 30, thereby providing clear oil for sealing purposes.

A tube 12 is ported into the plenum chamber 10 at the top to draw off the water vapor and connects into the condenser 13. The condenser 13 is essentially a long tube having considerable surface area for the transfer of heat from the contained vapor to the ambient fluid surrounding the condenser. The condenser tubing frequently has secondary surface or fins attached to the metal of the tube to increase the area in contact with the ambient cooling fluid or medium. The vapor in losing its heat of vaporization to the outside medium, is reduced to a liquid provided the process is carried on at a pressure above the vaporization pressure of that temperature for the refrigerant fluid. For instance, assume the ambient temperature to be 80 degrees F. and then suppose the condenser temperature to be 100 degrees F. or 20 degrees F. above the ambient temperature to insure a reasonable rate of heat flow from the surface of the condenser 13 to the cooling medium.

Since the condensing pressure of water vapor at 100 degrees F. is 0.95 pound per square inch absolute (p. s. i. a.), an adequate pressure then for the compression side of the pump will be 1.0 p. s. i. a. to cause the vapor to recondense to liquid water.

This liquid refrigerant, water, is conveyed by the condenser tubing to the receiver 14 and collects on the bottom providing a reserve supply 15 for the liquid charge.

This liquid leaves the receiver through tube 16 to the boiler 4. At the entrance to the boiler is valve 17 acting on seat 18 to control the flow of liquid into the boiler. The valve 17 is actuated by the float 19, both being connected by a link 20 which fulcrums about the pivot 21. The valve admits liquid water into the boiler as long as the level of the liquid is below a predetermined point. But once the level reaches this point the height is sensed by the float 19 and closes the valve 17 on its seat 18. This effectively prevents further admission of liquid until the level is lowered. This is done by the heat from the exterior of the boiler 4 passing through the boiler metal causing the liquid inside the boiler to vaporize or boil away. As fast as the liquid vaporizes, the compressor removes the vapor to maintain the pressure constant provided an equilibrium has been reached between the capacity of the compressor and the heat load absorbed by the boiler.

The oil circuit starts at the boiler. As long as the gears are idle the oil floats on the top of the water 15 and in the lower part of the pump housing 11. The gears must turn in the right direction or there will be no refrigeration.

The left gear 5 must turn clockwise while the mating right gear 6 must turn in the opposite direction (anticlockwise). When the pump starts, the space between the teeth at the bottom of the case moves around the case toward the top and carries the oil with it and deposits it in the plenum chamber 10, since the oil cannot return past the mating teeth of the gears to the boiler. In a few turns most of the oil in the lower case and the boiler is returned to the bottom of the plenum chamber to seal the compressor. As long as the gears rotate and there is liquid refrigerant in the boiler the compressor is able to withdraw vapor out of the boiler.

Now since the oil lays continuously on top of a pair of rapidly rotating gears there is considerable turbulence and it is impossible to avoid the formation of an oil water emulsion 30 here. Since this emulsion is not a good sealer some means must be used to rid the oil of this contaminant. Also since the oil continuously rides the top of the gears, the lower part of the case is starved so some method should be provided to oil this part of the compressor. For these purposes a tube 22 is ported into the plenum chamber 10 near its bottom just above the gears so as to remain below the normal level of the oil in the chamber. This tube 22 leads to a vertical chamber 23 which has a tube 24 ported into it at the top and tube 24 tees into tube 12 leading to the condenser 13. Through the center of the chamber 23 is a tube 25 which carries hot exhaust gases from the engine 2. At the bottom of the chamber 23 is a horizontal tube 26 connecting into the gear case 11 below gear 6. This tube 26 can be divided to carry oil to a similar point in the case 11 under gear 5 as well.

In the tube 26 between the T if any and the vertical chamber 23 a hand control valve 27 or control orifice or restrictor may be inserted to control the rate of flow of oil into the low pressure side of the case 11. As tube 25 carries hot exhaust gases and has a temperature of 500 degrees F. and as the oil from the plenum chamber 10 at 100 degrees F. meets this hot tube in chamber 23, the water is driven off in the form of steam. The steam rises to the top of the oil and escapes past the baffle 31 and open mesh material 32 such as stainless steel wool packed in the upper part of chamber 23 to catch the oil coming off with the steam from the purifying chamber and return it. The steam escapes through the tube 24 into the condenser. The water is separated from the oil in chamber 23 and the oil is permitted to return to the low side of the pump through tube 26.

The compressor gears 5 and 6 are turned by power from the automobile engine 2. As long as they turn in the correct direction the oil is retained on the outlet side of the gear case. Normally the outlet port is at the top but need not be so placed. Assume however, that the outlet port 28 to the case 11 is at the top of the case. Assume a common tangent plane through the pitch cylinders at the contact line. The gear teeth must rotate so that at the contacting plane the teeth move toward the inlet port 29. Again assume the inlet port 29 to be at the bottom and the gear teeth at the contacting side or inner periphery of each gear move toward the inlet port and conversely the teeth on the opposite side or outer periphery of each gear move away from the inlet port trapping a small volume of vapor between them and in the case. They then move this amount of vapor toward the outlet port 28 at the top of the case.

As the teeth move upward with their charge of vapor, they suddenly pass the lip of the outlet port and the vapor is released upward while the sealing oil drops on the teeth sealing the contacting surface between the mating pair of teeth. As long as the gears are kept turning, the oil is kept moving toward the outlet port and since there is a plenum chamber surrounding this port there is considerable space for the oil charge. Sufficient space should be provided above the oil level for vapor to settle out of the oil.

Soon after starting, the space above the gears accumulates many small volumes of vapor from the inlet port and the pressure rises. The side of the case having the high pressure is known as the high pressure side or more simply "the high side." Conversely the suction side of the case is known as the low pressure side or "the low side." The oil seals the space between the high and low sides as long as the gears are rotated to carry the excess oil toward the top of the case and to the oil reservoir in the plenum chamber.

However when the gears stop turning, no oil returns to the plenum chamber. Sooner or later depending on the fit between the gear teeth and the case, all the oil is pressed back past the gears and case and is deposited in the boiler. There is water in the boiler so the oil merely falls on it and floats on top. It is extremely important that on starting again oil is available to the lower part of the gear at the first turn because it is necessary to the proper sealing of the compressor. For this reason the boiler is coupled close to the compressor so that the space above the water and below the gears is less than the oil charge. The oil charge is sufficient to submerge the lower part of the case and the teeth in it while filling the space above the water level in the boiler.

Thus on starting, the gears turn again, oil is immediately picked up and on returning to the plenum chamber seals the gears. As the pressure above the water in the boiler is lowered, the water begins to boil and the vapor carries the oil with it back to the gear pump and soon all the oil is removed from the boiler. The oil does no harm in the boiler, but on compressor operation it is needed in the lower part of the plenum chamber to seal the compressor high side from the low side.

I claim:

1. In an intermittently operated automobile having an engine, air conditioning apparatus with refrigerating means having refrigerant vapor tight components and connections in operable order and condition, said components including a condenser, a receiver, a boiler and a compressor; a charge of water refrigerant and a charge of oil distributed throughout said components; means to control the quantity of liquid refrigerant from said receiver in said boiler, said compressor including a pair of gears having meshing teeth and a case substantially enveloping, closely matching, almost touching, but to avoid friction spaced from the periphery of said gears; in said about and substantially perpendicular to the tangent plane common to the pitch cylinders of both gears, an inlet and an outlet port to carry refrigerant and oil, means whereby said engine rotates said gears so that the teeth of said gears at the arc of contact move toward the inlet port; said inlet port connected directly into said boiler; the space enclosed by the lower part of said case below the centerlines of the gears, said inlet port and said boiler forming the low side of said refrigerating means, said outlet port in the compressor case opposite said inlet port, and a plenum chamber on the side of the outlet port opposite the compressor forming with the upper portion, above the centerlines of the gears of said case, a part of the high pressure side of said refrigerating means; oil of said charge in said chamber, said outlet port and said case adjacent to said meshing teeth of said gears sealing the high pressure side from the low pressure side of said refrigerating means at the compressor; an oil return tube having one end ported into the plenum chamber below the top surface of the oil in said chamber and the other end ported into the low pressure side of the compressor case, a restrictor in said tube to control the rate of oil flow from the plenum chamber into said low side; and said boiler adjacent to said gears of said compressor, space in said low side above the surface of the liquid refrigerant in the boiler and below the gears to receive said oil from said plenum chamber through space between said gears and said case and through said oil return line from said plenum chamber and to store said oil of said oil charge during the time said engine and simultaneously operated compressor are idle.

2. In an intermittently operated automobile having an engine, air conditioning apparatus with refrigerating means having vapor tight components and connections in operable sequence and condition; said components including a condenser, a receiver, a boiler and a compressor; a charge of water refrigerant and a charge of oil distributed throughout said components; means to control the quantity of liquid refrigerant from said receiver in said boiler, said compressor including a pair of gears having meshing teeth and a case substantially enveloping, closely matching, almost touching, but to avoid friction spaced from the periphery of said gears; in said about and substantially perpendicular to the tangent plane common to the pitch cylinders of both gears, an inlet and on outlet port to carry refrigerant and oil, means whereby said engine rotates said gears so that the teeth of said gears at the arc of contact move toward the inlet port; said inlet port connected directly into said boiler; the space enclosed by the lower part of said case, below the centerlines of the gears, said inlet port and said boiler forming the low side of said refrigerating means, said outlet port in the compressor case opposite said inlet port, and a plenum chamber on the side of said outlet port opposite the compressor forming with the upper portion, above the centerlines of the gears of said case, a part of the high pressure side of said refrigerating means at the compressor; and said boiler adjacent to said gears of said compressor, space in said low side above the surface of the liquid refrigerant in the boiler and below the gears to receive said oil from said plenum chamber through said space between said gears and said case and to store said oil of said oil charge during the time said engine and simultaneously operated compressor are idle.

3. In an intermittently operated mechanical refrigeration system comprising operatively connected components including a condenser, a receiver, a boiler and a gear compressor; a charge of water refrigerant and a charge of compressor sealing oil distributed throughout said components; said gear compressor and said boiler having a common housing with a common connecting port, said gear compressor having a pair of gears with meshing teeth, said housing fitting closely but spaced from said mating gears, said oil sealing the space between said housing and said gears, a plenum chamber connected between said compressor and said condenser, said chamber ported into the compressor housing on the side of the gears opposite the boiler port, said plenum chamber having sufficient volumetric capacity to hold the oil charge plus some space for refrigerant vapor; liquid water refrigerant in said boiler and space remaining in said common compressor and boiler above the surface of said refrigerant and below said gears to store a sufficient quantity of sealing oil so that after a prolonged compressor at rest period sufficient oil remains in the low side to at least wet the tips of said teeth of said gears.

4. In an intermittently operated automobile, having an engine; engine driven refrigerating apparatus for air conditioning having refrigerant tight components and connections in operable sequence and condition, including a condenser, a liquid refrigerant receiver, a boiler and a compressor; a charge of water refrigerant and a charge of compressor sealing oil distributed about said apparatus; means to control the quantity of liquid refrigerant in said boiler, said compressor including a pair of matching gears with meshing teeth, a housing substantially enveloping said gears and closely matching the periphery but spaced from said gears to avoid friction, a compressor inlet and an outlet port in said housing, said housing common to said compressor and said boiler and a common port between them, a plenum chamber connection between said compressor outlet port and said connection to said condenser, said chamber having sufficient volumetric capacity to contain the charge sealing oil plus some space for compressed refrigerant vapor from the compressor and surplus of said oil charge not in remainder of apparatus in said plenum chamber, compressor outlet port and compressor housing above the gears sealing the space between the housing and the gears when the engine and compressor are running and said surplus oil in the space in the housing below the gears, the compressor inlet port and above the liquid refrigerant in the boiler shortly after the engine and engine driven compressor has stopped.

5. In an automobile having an engine, air conditioning apparatus with operative connections and refrigeration components in operating sequence and having operative connections said components including a condenser, a receiver, a boiler and a gear compressor, a charge of water refrigerant and a charge of sealing oil distributed throughout said components, said compressor driven by said engine and said compressor having a pair of gears with meshing teeth, a case with inlet and outlet ports to pass refrigerant vapor and oil in and out of said compressor, said case fitting the periphery of said gears very closely so that sealing oil can seal the space between the gears and the case, thereby sealing the outlet side, the high pressure side, of said case from the inlet side the low pressure side of said case, connected between said outlet port of said compressor and said connection to said condenser a plenum chamber having sufficient volume to contain all the oil charge plus space for water vapor, said chamber collecting the compressed water vapor and water contaminated oil from said compressor, said vapor separating out of said oil and rising to the top of said chamber and passing out of the chamber through said condenser connection which is ported into the top of the chamber, while said water contaminated sealing oil remains in the lower portion of said chamber, an oil return tube having one end ported into said chamber near the bottom and below the surface of said contaminated oil and the other ported into the low pressure side of the said case, in said return tube near the low side port a restrictor to control rate of oil return to the compressor, in said return tube an expanded section standing vertically and part extending above the oil level in the chamber, filter material on said extended part, a hot pipe heated by exhaust from the engine passing through the expanded section heating said contaminated oil considerably beyond the boiling point of the water contained in said oil driving the water out of the oil in the form of vapor said vapor passing through said filter while the water free oil is trapped and falls back into the expanded section and a tube having one end ported into the top of said expanded section of the return tube above the filter and the other into the condenser for removing water vapor from top of said section and returning it to said refrigeration system condenser, said purified oil now passing down through the return line past the restrictor and into the low side of said compressor.

6. In an automobile having an engine with an exhaust line, refrigerating apparatus for air conditioning with operative arrangement and connections, components of said apparatus including a condenser, a receiver, a boiler and a gear compressor with a pair of mating gears driven by said engine, a charge of water refrigerant and a charge of sealing oil distributed about said components, said compressor having a vapor tight housing closely encasing said gears and said oil sealing the space between said gears and said housing, dividing the high pressure side from the low pressure side, an outlet port and an inlet port in said housing each in the high and low pressure side respectively, said vapor tight housing common to said compressor and said boiler and a common port between said compressor and said boiler, a plenum chamber on the side of the compressor opposite the boiler, a common port connecting the chamber to the compressor, said chamber containing most of the oil and some refrigerant vapor and having two outlet ports one at the top for refrigerant vapor to enter the condenser connection and the other near the bottom to permit oil to enter the oil return tube, means in said return tube for heat from engine exhaust lines to drive water vapor out of said oil and a tube to deliver said vapor into the condenser of said apparatus and said oil return tube carrying said purified oil to the low side of said compressor to lubricate said gears and replenish sealing oil lost to the plenum chamber, and a restrictor in said oil return tube near the connection of the tube to the low side.

References Cited in the file of this patent

UNITED STATES PATENTS

| | | |
|---|---|---|
| 683,614 | Meston | Oct. 1, 1901 |
| 924,024 | Wilkin | June 8, 1909 |
| 1,105,312 | Sundh | July 28, 1914 |
| 1,458,204 | Tibbetts | June 12, 1923 |
| 1,471,984 | Sweet | Oct. 23, 1923 |
| 1,635,058 | Potter | July 5, 1927 |
| 1,688,342 | McCuen | Oct. 23, 1928 |
| 2,155,051 | Kagi | Apr. 18, 1939 |
| 2,444,537 | Seldon | July 6, 1948 |
| 2,464,631 | Zwickl | Mar. 15, 1949 |
| 2,568,711 | Bosi | Sept. 25, 1951 |
| 2,701,684 | Kirsch | Feb. 8, 1955 |